United States Patent [19]

Tajima et al.

[11] Patent Number: 4,509,143
[45] Date of Patent: Apr. 2, 1985

[54] COMPUTER CONTROL SYSTEM FOR SELECTING A DESIRED CONTROL PROGRAM FROM A PLURALITY OF CONTROL PROGRAMS

[75] Inventors: Shinobu Tajima; Yasukazu Umeda; Toshiyuki Kamohara, all of Inazawa, Japan

[73] Assignee: Mitsubishi Denki Kabushiki Kaisha, Aichi, Japan

[21] Appl. No.: 519,345

[22] Filed: Aug. 1, 1983

Related U.S. Application Data

[62] Division of Ser. No. 224,236, Jan. 12, 1981, Pat. No. 4,410,959.

[51] Int. Cl.$^3$ .................. G06F 9/22; G06F 13/06; B66B 1/18
[52] U.S. Cl. .................. 364/900; 187/29 R
[58] Field of Search ... 364/200 MS File, 900 MS File; 187/29 R

[56] References Cited

U.S. PATENT DOCUMENTS

| 3,686,639 | 8/1972 | Fletcher | 364/200 |
| 4,021,783 | 5/1977 | Highberger | 364/900 |
| 4,288,859 | 9/1981 | Zeindler et al. | 364/900 |
| 4,345,670 | 8/1982 | Kaneko et al. | 187/29 R |
| 4,368,518 | 1/1983 | Torazono et al. | 364/200 |

FOREIGN PATENT DOCUMENTS

| 1408666 | 10/1975 | United Kingdom . |
| 1459177 | 12/1976 | United Kingdom . |
| 1486199 | 9/1977 | United Kingdom . |
| 1497158 | 1/1978 | United Kingdom . |
| 1550238 | 8/1979 | United Kingdom . |
| 1571736 | 7/1980 | United Kingdom . |

Primary Examiner—Harvey E. Springborn
Attorney, Agent, or Firm—Sughrue, Mion, Zinn, Macpeak, and Seas

[57] ABSTRACT

A computer control system for a controlled apparatus such as an elevator executes operation with a plurality of standard programs corresponding to the conventional standard elevator relay circuits, the plurality of standard programs being stored in a ROM (Read Only Memory) device.

The computer control system is equipped with a special program corresponding to at least one of the plurality of standard programs, and the special program is stored in a ROM device. If the elevator is to operate in a standard mode, the computer control system operates using only the standard ROM devices. If the elevator is to operate in a modified mode, the computer control system operates using the standard ROMs together with the special ROM, a control signal corresponding to this special ROM device being employed as a valid control signal. In both modes of operation, the standard program is not modified.

4 Claims, 10 Drawing Figures

COMPUTER CONTROL SYSTEM FOR SELECTING A DESIRED CONTROL PROGRAM FROM A PLURALITY OF CONTROL PROGRAMS

This ia a division of application Ser. No. 224,236, filed Jan. 12, 1981, and now U.S. Pat. No. 4,410,959.

BACKGROUND OF THE INVENTION

1. Field of the Invention

This invention relates to improvements in a computer control system for selecting one control program from a plurality of control programs which output the same kind of signal, for the control of an elevator or the like.

2. Description of the Prior Art

In the following explanation, reference will be made to an elevator control system as an example of a system wherein the present invention may be used.

FIGS. 1 and 2 depict a portion of a conventional elevator control system which does not employ computer control. In FIG. 1, a "call" or floor level stop determination circuit for a standard type of an elevator which operates between a first floor and a fifth floor is shown, wherein the reference symbols + and − designate a D.C. (direct current) power source and 1F–4F designate car position relay contacts which close when the car approaches each of the floors 1 to 4. Similarly, car position relay contacts 2G–5G are relay contacts for each of the floors 2 to 5. The reference numeral 1U–4U designate "up call" relay contacts which are closed when the respective "up" buttons at each of the floors 1 to 4 are actuated, 2D–5D designate "down call" relay contacts which are closed when the respective "down" buttons on floors 1 to 5 are actuated, and 6A and 6B designate control relay contacts which are closed during the normal operation of the car. "Up" operation relay contact 7 is closed during the upward operation of the elevator car, and similarly, "down" operation relay contact 8 is closed during the downward operation of the car. "Up" travel relay contact 9 is closed during the travel of the car in the upward direction, and similarly, "down" travel relay contact 10 is closed during the travel of the car in the downward direction. Floor level stop determination relay 11 generates a command signal for stopping the elevator car in response to the actuation of the "call", i.e., up or down buttons arranged at the several floors, when relay 11 is energized.

FIG. 2 illustrates an example of a special type of floor level determination circuit for an elevator which operates between a first and a fifth floor in a mode different from that of FIG. 1.

In FIG. 2, the floor level stop determination relay 11A generates a command signal for stopping the elevator car in response to a "call" when relay 11A is energized. Nonstop relay contacts 12A and 12B are opened when a "nonstop" button in the car is pressed. The other component parts of FIG. 2 are substantially the same as those of FIG. 1, and are accordingly similarly labeled. Depending upon whether the "nonstop" button is depressed, the elevator car will operate in one of two distinct modes, as will be readily understood.

Conventional elevator control circuits are composed of relay circuits such as those shown in FIGS. 1 and 2. The number of relays employed in a typical elevator is about one hundred. The number of relays employed in a sophisticated elevator may be several hundred. The standardization of these relay circuits has progressed somewhat, and the majority of elevators in use today can be controlled by standardized circuits. However, some existing elevators still need special circuits.

The operation of the conventional relay circuits will now be described with reference to FIGS. 1 and 2.

In FIG. 1, when a "up" call is made at, for instance, the third floor and the car, in normal operation, is travelling in the upward direction approaching the third floor, floor level stop determination relay 11 is energized by the circuit (+)−3F−3U−6A−9−11−(−), and the car commences deceleration for stopping at the third floor in accordance with known car stopping and leveling circuitry (not shown).

When the car is travelling in the upward direction and no "up" call is made, and therefore upward operation is not needed, "up" operation relay contact 7 is closed, and the car is stopped by the circuit (+)−7−9−11−(−).

In the majority of elevators, the circuit in FIG. 1 performs the floor level stopping determination. However, in a manually operated elevator, which is fitted with a nonstop button, the circuit shown in FIG. 2, containing partial changes to the standard circuit, is necessary.

In FIG. 2, when an "up" call is made at the third floor, and the car, in normal operation, is travelling in the upward direction approaching the third floor, if the nonstop button is pressed, floor level stop determination relay 11A will not be energized because nonstop relay contact 12A is open, and the car thus passes the third floor without stopping.

Thus, when the elevator is required to operate in a manner different from the standard operation, modifications to the elevator control circuit are necessary. These modifications, such as the addition of a "nonstop" mode, may be effected by the addition of further switches and relays to the standard control circuit.

In recent years, the use of electronic computers has become widespread, as have elevator control circuits composed of electronic computers, for use in elevators ranging from the more sophisticated types down to the more basic models.

In computerizing elevator control circuits, the computer programs have been patterned after the same circuitry used in the conventional relay circuits due to considerations of familiarity with the old system among the many parties concerned with the design, erection, and maintenance of the elevator systems.

FIG. 3 shows a typical prior art computer control system for an elevator.

In FIG. 3, a central processing unit (CPU) 21 executes in sequence the programs of read only memories (ROMs) 22A–22C, in which have been stored the elevator control programs. In random access memory (RAM) 23 is stored the ON/OFF data corresponding to the relay contacts and relay coils shown in FIGS. 1 and 2. The reference numerals 24 and 25 designate a data bus and an address bus which transfer the data between ROMs 22A–22C, RAM 23 and CPU 21. Input circuit 30 inputs ON/OFF state signals of various relay contacts and coils concerning the elevator, and generates input data. Signals from input terminals 31 and 31a to 31n are stored in RAM 23 as shown in FIG. 4 by the control of CPU 21 via the data bus 24 and the address bus 25.

ROMs 22a to 22c are constituted by 3 ROM IC devices of the 2716 type (16K(2K×8) UV Erasable PROM) manufactured by Intel.

The number of ROM IC devices may increase or decrease in accordance with the quantity of control programs, and in this case, 3 ROM IC devices have been determined to be necessary. Included in ROMs 22a to 22c are the various control programs for floor level stop determination, car running direction determination, door control, hall and in-car car position indicator control, and so on.

The CPU 21 is an 8085A type device manufactured by Intel. With regard to the operation of this device, reference should be made to the "MCS-85 TM USER'S MANUAL" published by Intel, wherein detailed explanation is to be found.

FIG. 4 shows stored data corresponding to the ON/OFF state signals of the relay contacts and coils shown in FIG. 3 1, and the mutually corresponding relay contact data and relay coil data.

Output circuit 35 receives control data stored in RAM 23 by the control of CPU 21 via data bus 24 and address bus 25, and generates output signals for controlling motors, power sources and ON/OFF relays corresponding to output terminals 36, 36a–36n.

A floor level stop determination program corresponding to the circuit shown in FIG. 1 employed as the computer control system for the elevator is illustrated in FIG. 5. FIG. 5 shows a flow chart corresponding to this program, which is stored together with an address in ROM 22A.

In FIG. 5, each of the designated registers A, B and C temporarily a store data and are installed in CPU 21. Reference symbol V designates logical addition, ∩ designates logical multiplication, →designates data flow for writing in a memory or register, and a bar across the top of an item of data (e.g., contact 7 data) designates the complement of the data.

For example, the execution of the 13th step "contact 7 data V register A data→register A" is as follows: contact 7 data (i.e, "ON" or "OFF") stored in RAM 23 is read out and the complement thereof is taken. The complement data and the data stored in register A are logically added, and the addition data is written in register A. The executions of the remaining steps are similar to the execution of the 13th step, and therefore are not further explained herein.

In general, in accordance with the programs stored in ROM 22A, CPU 21 reads data corresponding to relay contacts 1F–4F, 2G–5G, 1U4U, 2D–5D, 6A–6B, and 6–10, which are stored in RAM 23, and executes operations such as AND or OR corresponding to the circuit shown in FIG. 1, and stores the resulting data, such as that corresponding to the state of relay coil 11, in RAM 23. In the same way, CPU 21 executes other programs, and periodically 50m–100m sec) executes the programs stored in ROMs 22A–22C.

An example of the operation of the foregoing might be where an elevator car is in the vicinity of the second floor and is moving in the upward direction. Then, at that moment, the 'UP' button on the third floor is pressed. Pressing this button provides an input to the input circuit 30, and during the period thereof, a third floor 'UP' call data is recorded in RAM 23 by CPU. That is to say; closure of the contact 3U is indicated in RAM 23. The car continues to travel upwards, and when it trips a cam switch (not shown) provided, for instance, in the hoistway, which switch indicates proximity to the third floor, this signal is in the same way as above said inputted by input circuit 30, and the contact in RAM 23 shows ON data. Generally the elevator control cycle for the CPU takes about 50–100m sec, and in the next period after the 3F contact closes, the coil 11 is energized, (as shown in the flow chart of FIG. 5) because contacts 3F and 3U are closed. When the coil 11 is energized, a corresponding signal is outputted via the output circuit 35 and accordingly, the motor is made to decelerate.

If the standard circuit is modified to achieve the functions of the special circuit shown in FIG. 2, the relay contacts 12A and 12B enter into the scheme, and so the program will be as shown in FIG. 6, differing slightly from the standard program shown in FIG. 5. In the program of FIG. 6, steps 61 and 62 are added to the standard program in FIG. 5.

In this way, if the standard program stored in ROM 22A needs to be rewritten due to a modification thereof, ROM 22A as well as ROM 22B and 22C will have to be completely changed because of the necessity of changing the addresses for the programs stored therein.

In other words, if the program is to be modified slightly from standard, the majority of the programs stored in the ROMs can no longer be used and so special programs i.e., special ROMs) must be used. Accordingly, in order to provide a complete system wherein hardware failures can be quickly remedied, spares of all the special types of ROMs must be kept on hand. Further, there is the disadvantage that the cost is increased if there are many "specialty" parts, as stated above.

SUMMARY OF THE INVENTION

Accordingly, an object of this invention is to eliminate all of the above-described disadvantages of the prior art.

More specifically, an object of this invention is to provide a computer system which is capable of satisfying the above requirements by adding or modifying programs without amending the standard program when there is a change in the control requirements from one mode of control to another.

It is another object of this invention to provide a computer control system for selecting one control program among a plurality of control programs which output the same kind of control signal.

These objects are attained by providing a computer control system which inputs a plurality of state or condition signals from a controlled apparatus and which executes operation with a plurality of predetermined programs, and which controls the controlled apparatus with the executed results, comprising data memory means for storing state signals received from an input circuit; a first program memory means for storing a plurality of predetermined programs for the control of the controlled apparatus and for obtaining at least one control signal each; a central processing unit CPU for executing operation by employing stored data in the data memory in accordance with said plurality of programs and for obtaining control signals, with these control signals being stored in the data memory means; and a second program memory means for storing a program generating at least one control signal which is the same kind of control signal corresponding to one of the plurality of predetermined programs, one of the control signals corresponding to programs stored in the first and second program memory means being employed as a valid control signal.

DESCRIPTION OF THE PREFERRED EMBODIMENTS

Figure 3:
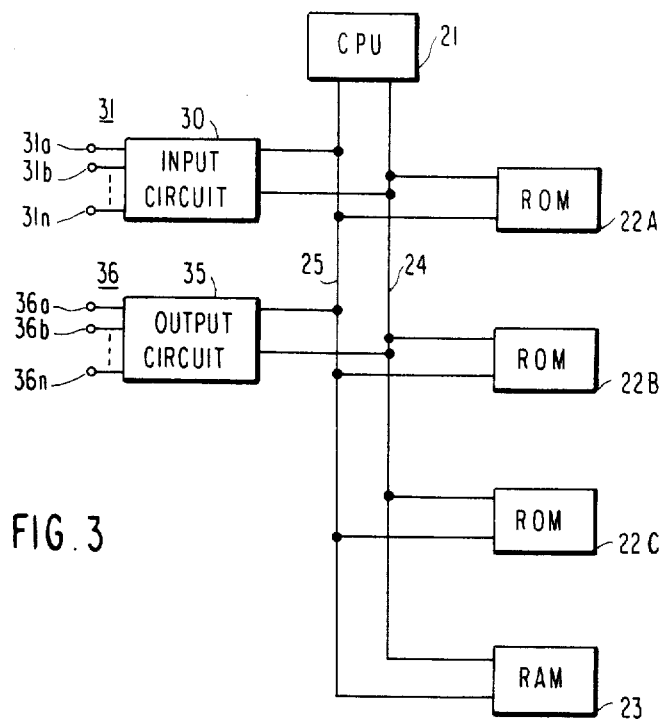
FIG. 3 is a block diagram of a control section showing a computer control system for a conventional elevator.
Figure 4:
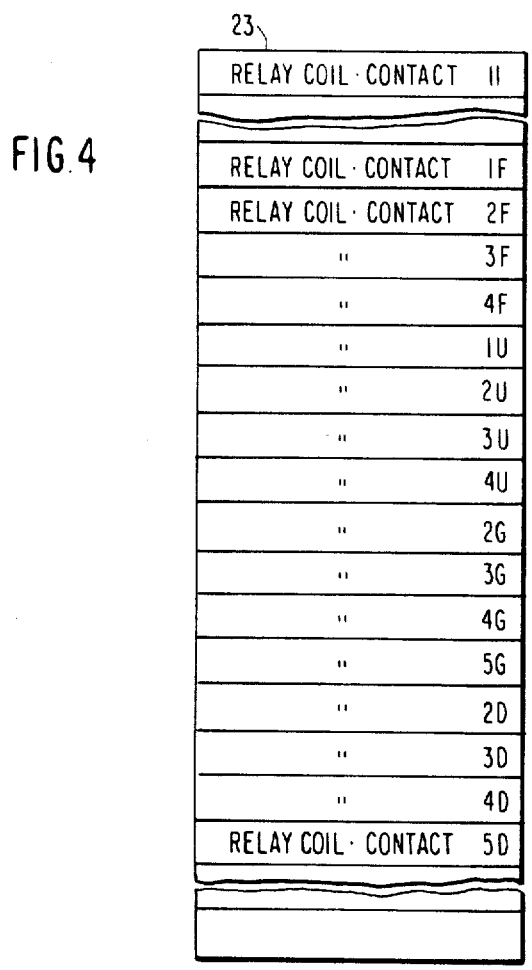
FIG. 4 illustrates data stored in RAM 23 of FIG. 3.
Figure 8B:
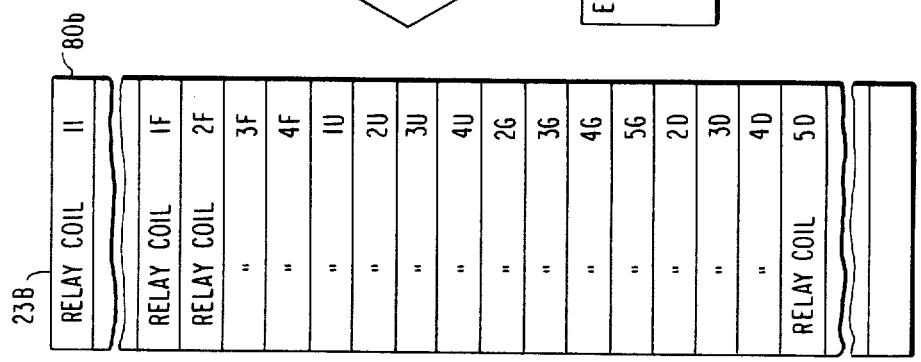
FIGS. 8A and 8B illustrate data stored in RAMs 23A and 23B of FIG. 7.
Figure 8A:
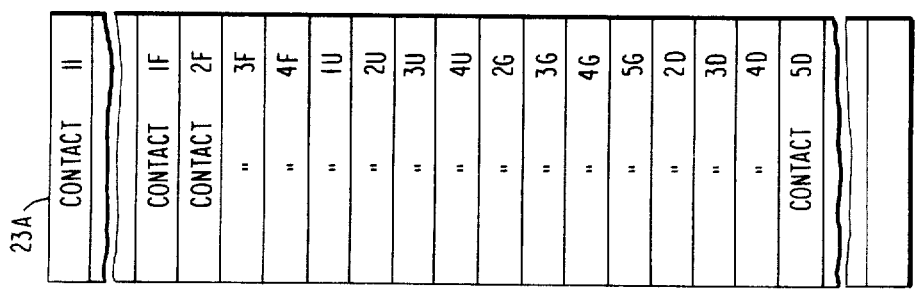
Figure 7:
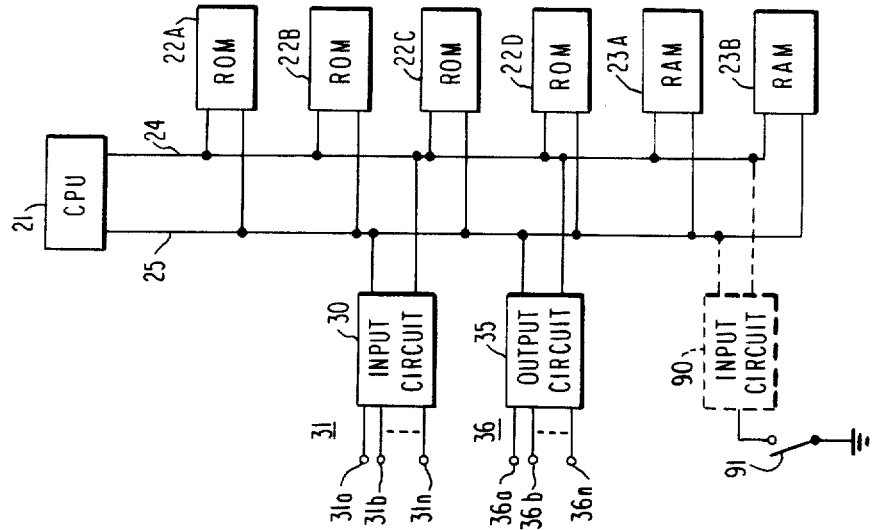
FIG. 7 is a block diagram of a control section showing a computer control system for an elevator according to the invention.

In FIG. 7, the reference numeral 22D designates a ROM in which is stored a "special" program for elevator control; 23A designates a RAM in which is stored ON/OFF data corresponding to the relay contacts, as shown in FIG. 8A; and 23B designates a RAM in which is stored ON/OFF data corresponding to the relay coils, as shown in FIG. 8B. The remaining components are substantially the same as those in FIG. 3.

Figure 1:
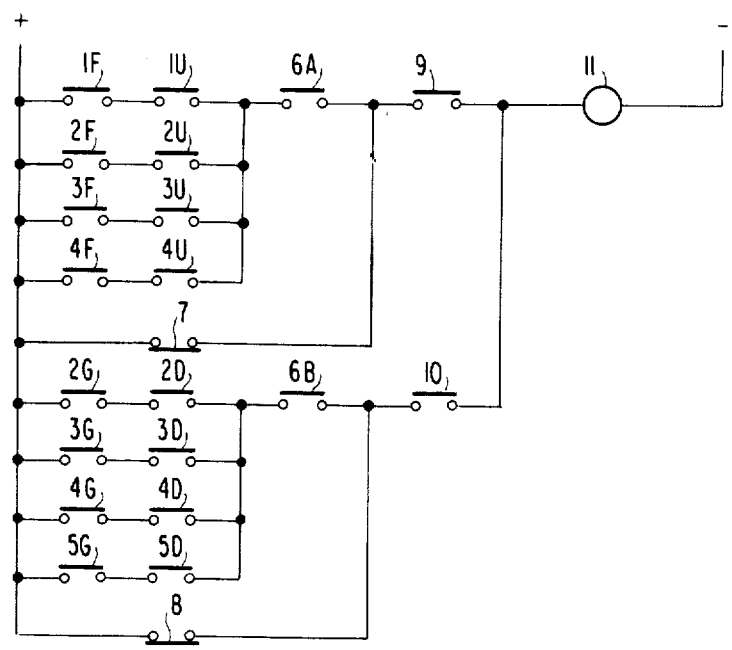
FIG. 1 is one example of a relay circuit showing a portion of a standard type control apparatus for a conventional elevator.

In the system of FIG. 7, if the program corresponding to the circuit shown in FIG. 1 is employed, ROM 22D is not provided.

Since the data stored in RAM 23A corresponds to the relay contacts, and the data stored in RAM 23B corresponds to the relay coils, CPU 21 executes the programs stored in ROMs 22A-22C in a predetermined order using the data stored in RAM 23A, and successively stores in RAM 23B the resulting data such as that corresponding to all the relay circuits of the conventional system. When one execution period ends, CPU 21 transfers the data stored in RAM 23B to RAM 23A, and executes and stores anew in the next execution period. The method of operation is substantially the same as that mentioned above in connection with FIGS. 3-6.

Figure 2:
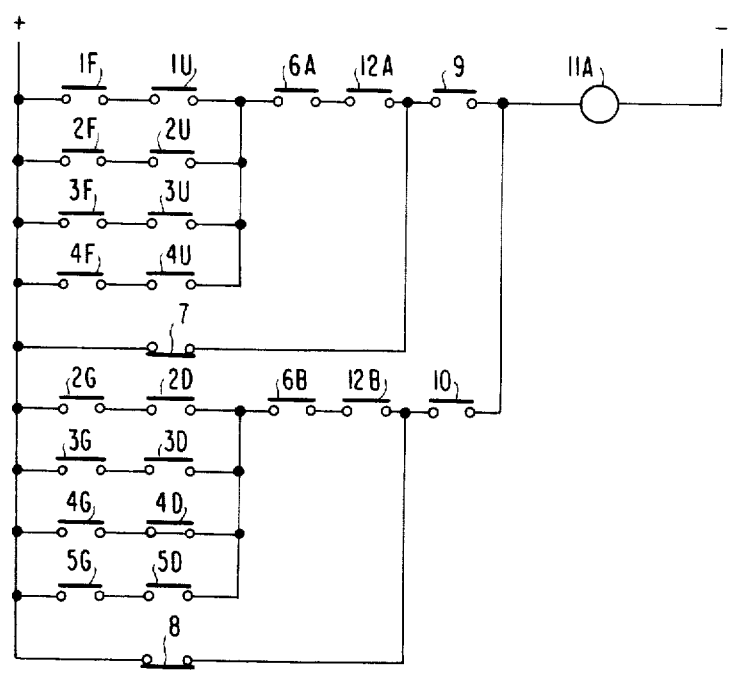
FIG. 2 is one example of a relay circuit showing a portion of a specialized type of control apparatus for a conventional elevator.
Figure 5:
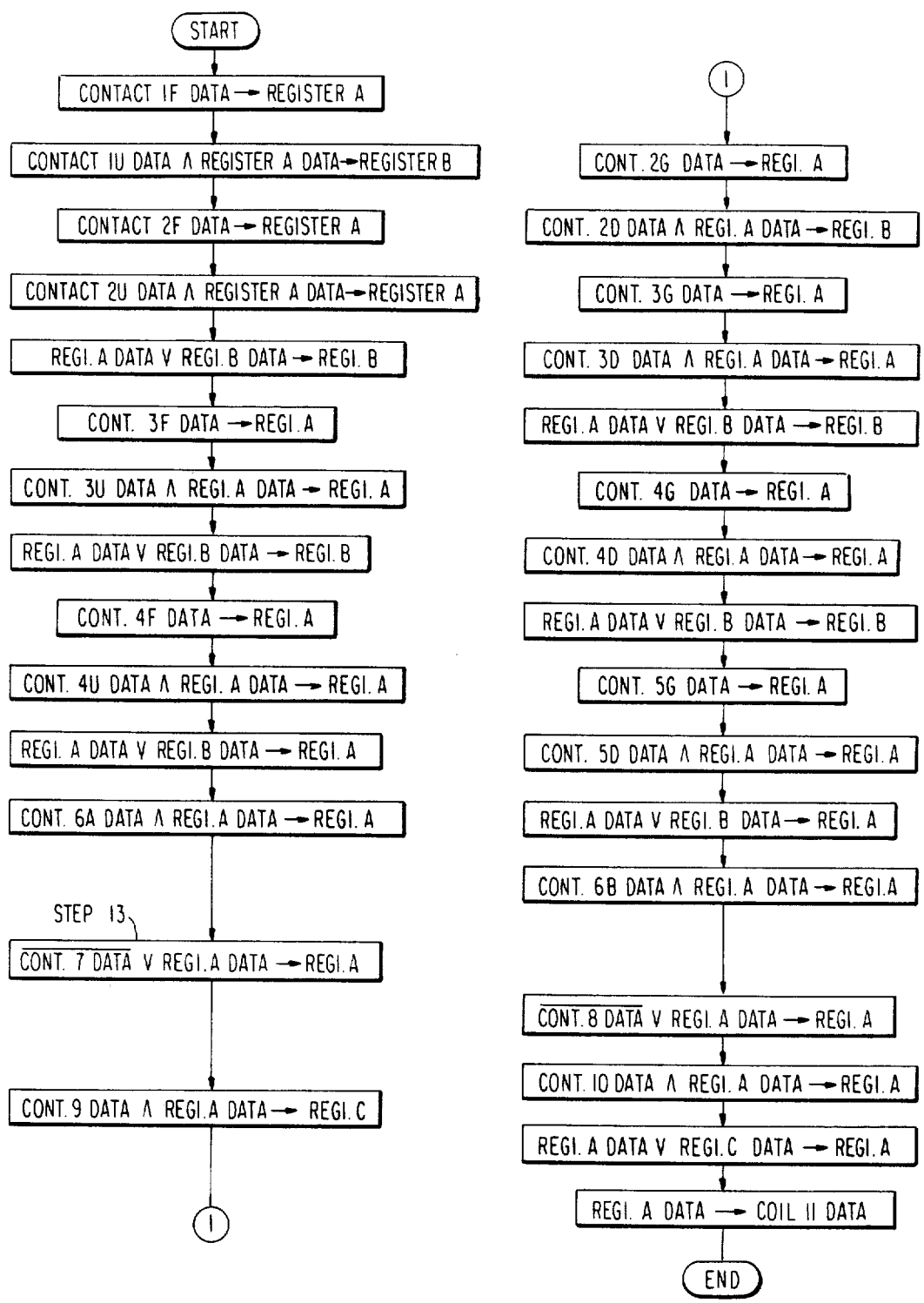
FIG. 5 is a flow chart of a computer program corresponding to the relay circuit shown in FIG. 1.
Figure 6:
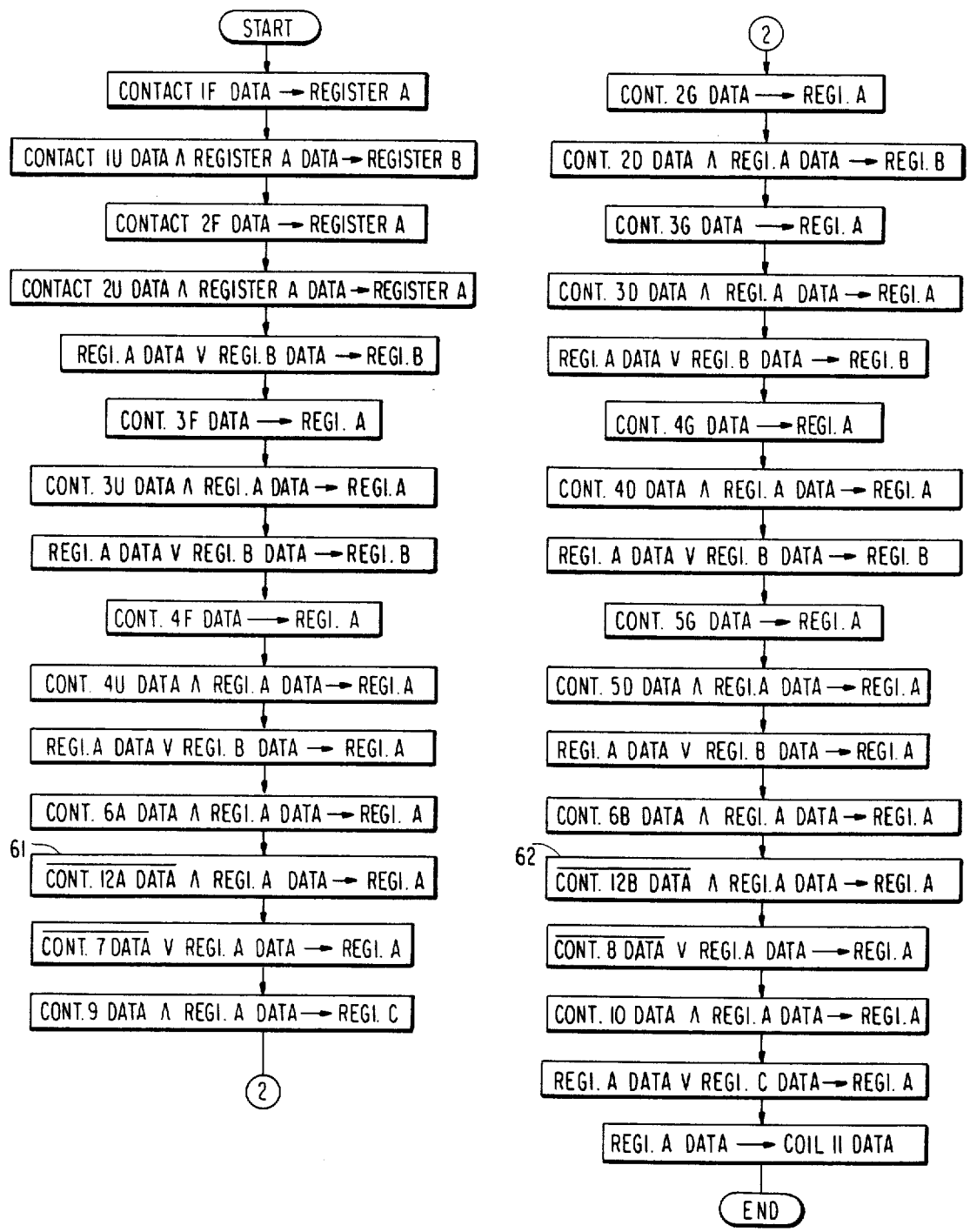
FIG. 6 is a flow chart of a computer program corresponding to the relay circuit shown in FIG. 2.

In the operational mode or program corresponding to the circuit shown in FIG. 2, which differs slightly from FIG. 1, is employed, the computer control will have two programs, as shown in FIGS. 5 and 6.

In FIG. 7, the standard program stored in ROM 22A is retained, and the special program stored in ROM 22D is added. In one execution period, the special program is executed by CPU 21 after the execution of all the standard program has been completed. For example, the executed data corresponding to floor level stop determination relay 11 is temporarily stored in data area 80$b$ of RAM 23B by the program stored in ROM 22A shown in FIG. 5. In succession, before transferring the contents of RAM 23B to RAM 23A, the program in ROM 22D is executed using the data in RAM 23A, such that the executed result data corresponding to relay 11 is restored in the same data area 80$b$ of RAM 23B. Thus, the resulting data of the standard program is extinguished, and the resulting data of the special program is stored in data area 80$b$ of RAM 23B.

In succession, since CPU 21 transfers the data stored in RAM 23B to RAM 23A, and executes various programs with the data stored in RAM 23A, the resulting data of the standard program is in practice disregarded, and the resulting data of the special program is retained as valid data. Thus, in this example, the last executed data is chosen as the valid control data.

Namely, all of the programs have their functions modified by the addition of programs without changing the standard program.

Accordingly, since the overall number of special ROMs, in which are stored various programs, can be reduced, the number of spare programmed ROMs can be reduced, and maintenance costs become low. Further, apart from maintenance, a reduction of costs can be anticipated from the standardization of design and explanatory literature.

In the event of a breakdown in the programmed memory corresponding to the special circuits, if the computer control system is able to control with the standard programs only for awhile, spare programmed memories for the special circuits do not have to be kept on hand, and so an even greater reduction in maintenance costs can be achieved.

Even if an additional program and a standard program are stored in one ROM device, the manufacture of the programmed ROM is easy because the standard program is not modified.

In these embodiments, the operation deals with a standard program and a special program. However, the system is not limited to such and may have a variety of special programs, provided these programs are given priorities, and one of the programs can be selected as the valid program.

In this example, the last executed program is given priority by the executing order of the program. However, more generally, if there are a plurality of programs corresponding to the ON/OFF states of the relays, any one of those programs may produce valid results, with the remaining results invalid, due to the use of a predetermined priority order.

Figure 9:
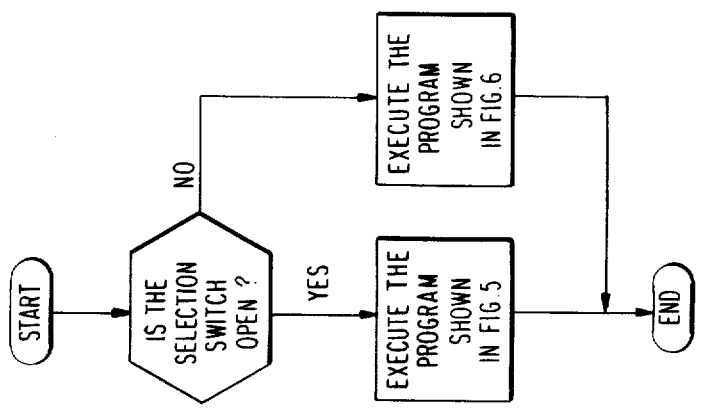
FIG. 9 is a flow chart of a priority executing program according to another embodiment of the invention.

For example, both the programs shown in FIGS. 5 and 6 may be stored in ROM 22, and a selection program may be added into ROM 22D to select whether the program shown in FIG. 5 or that shown in FIG. 6 is to be executed, by means of the switch signal from a switch 91 via the input circuit 90 shown in FIG. 7. FIG. 9 is a flow chart illustrating the priority executing program.

In accordance with the present invention, a plurality of programs corresponding to a plurality of circuits for making one relay are prepared, and any one of the control signals from each program can be given priority whereby the executed program can be changed without modifying the standard program, and thus a reduction of the various costs can be substantially anticipated by standardization.

In the foregoing embodiments of this invention, description has been made with reference to an elevator system, but as is clear from the appended claims, this invention may equally be applied to computer control systems other than those for elevators.

What is claimed is:

1. In a control device for an elevator system comprising a central processing unit, a first read-only memory for storing a first set of program instructions for computing output control signals for operating controlling means of said elevator system in response to input instructing signals to said central processing unit, an output circuit for communicating said output control signals to said controlling means, a first random access memory for storing said output control signals produced as a result of execution of said first set of program instructions immediately prior to said output control signals being communicated to said controlling means by said output circuit, and address and data buses for connecting said first read-only memory, said output circuit, and said first random access memory with said central processing means, the improvement comprising: a second read-only memory and a second random access memory, said second read-only memory and said second random access memory being connected to said central processing means by said address and data buses, said second read-only memory containing a second set of program instructions for selectively modifying said output control signals produced as a result of said first set of program instructions.

2. The control device of claim 1, including means for first storing results of said central processing means executing said first set of programming instructions in said second random access memory, including means for selectively modifying said stored results as a result of said central processing means executing said second set of programming instructions, and including means for transferring said modified results to said first random access memory as said output control signals for communication by said output circuit to said controlling means.

3. The control device of claim 2, wherein the storage capacity of said second read-only memory is significantly less than the storage capacity of said first read-only memory.

4. The control device of claim 3, further comprising means for selectively inhibiting execution by said central processing means of said second set of program instructions so as to prevent the selective modifying of said stored results.

* * * * *